United States Patent [19]

Dunderdale

[11] 4,046,854
[45] Sept. 6, 1977

[54] RECOVERY OF TITANIUM TETRACHLORIDE

[75] Inventor: John Dunderdale, Grimsby, England

[73] Assignee: Laporte Industries Limited, London, England

[21] Appl. No.: 696,361

[22] Filed: June 15, 1976

[30] Foreign Application Priority Data

July 4, 1975 United Kingdom ............. 28176/75

[51] Int. Cl.² ...................... C01G 23/02; C01G 49/06
[52] U.S. Cl. ...................... 423/77; 423/74;79;492;633
[58] Field of Search ................................... 423/74–77, 423/79, 149, 492, 493, 500, 613, 633

[56] References Cited

U.S. PATENT DOCUMENTS

| 1,933,702 | 11/1933 | Brown | 423/150 |
| 2,653,708 | 9/1953 | Lane | 423/613 |
| 2,657,976 | 11/1953 | Rowe et al. | 423/74 |
| 3,261,664 | 7/1966 | Cairns et al. | 423/77 |
| 3,325,252 | 6/1967 | Wikswo | 423/633 |
| 3,865,920 | 2/1975 | Dunn | 423/74 |

OTHER PUBLICATIONS

Antipov et al., "Kinetics of the Reaction Between Titanium Tetrachloride and Oxygen" *Zh. Prikl. Khim.* (1967) 40 (1), pp. 11–15.
Glorge, et al., "Formation of $TiO_2$ Aerosol from the Combustion Supported Reaction of $TiCl_4$ and $O_2$" Faraday Symposium of the Chemical Society (1973), vol. 7, p. 63.

*Primary Examiner*—O. R. Vertiz
*Assistant Examiner*—Brian E. Hearn
*Attorney, Agent, or Firm*—Kane, Dalsimer, Kane, Sullivan and Kurucz

[57] ABSTRACT

The recovery of titanium tetrachloride from a mixed titanium tetrachloride/ferric chloride vapor, suitably as produced by the fluidized bed chlorination of an iron containing titaniferous ore such as ilmenite is by treating the vapor with excess oxygen over that required in theory to oxidize the ferric chloride content thereof while maintaining the vapor at a temperature within the range of 500° C to 800° C, removing the resulting ferric oxide particles from the vapor, cooling the vapor to a temperature above the boiling point of titanium tetrachloride to condense residual ferric chloride in the vapor and separating the condensed ferric chloride, and recovering the remaining titanium tetrachloride containing vapor.

The residual ferric chloride, and chlorine remaining in the vapor after recovery of the titanium tetrachloride may be recycled.

16 Claims, 2 Drawing Figures

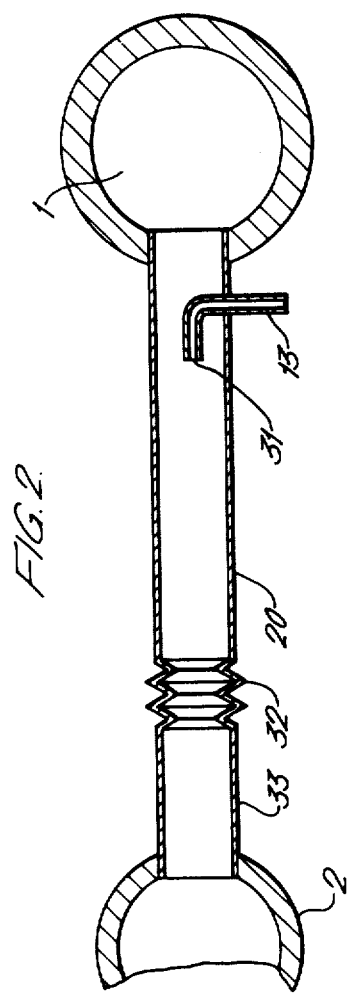

4,046,854

RECOVERY OF TITANIUM TETRACHLORIDE

BACKGROUND OF THE INVENTION

1. Field of the Invention

This invention relates to the recovery of titanium tetrachloride.

2. Brief Description of the Prior Art

Titanium tetrachloride may be produced from an ore by chlorinating the ore or ore concentrate selectively in a fluid bed so that the iron values present in the ore are converted to iron chlorides which are removed from residual titanium values in the ore beneficiate. The residual titanium values may then be chlorinated, in a separate operation, to titanium tetrachloride. This method of producing titanium tetrachloride involves the loss of a certain proportion of the titanium values in the ore, by chlorination and removal as vapour with the iron values, since in practice the degree of selectivity of chlorination of the iron values will fall somewhat short of theoretical. A further disadvantage of this method is that a high heat load is incurred as a result of removing hot beneficiate from the bed. To replace the heat removed a feed preheater is required and this is expensive both in first cost and in fuel. To avoid these disadvantages attempts have been made to produce titanium tetrachloride by chlorinating both the iron and titanium values in the ore, removing the resulting iron and titanium chlorides as a vaporous mixture and then separating the iron chloride from the titanium chloride by condensation of the iron chloride to a solid. The recovery of chlorine from the condensed iron chloride requires volatilisation thereof with an accompanying heat requirement which makes the recovered chlorine relatively expensive.

It would be desirable to recover the chlorine from the iron chlorides in the vapour phase, thus eliminating this heat requirement, by, for example, oxidising the iron chlorides in the vapour phase to produce iron oxide and molecular chlorine. Such an oxidation is readily accomplished in the substantial absence of titanium tetrachloride as is disclosed in U.S. Pat. No. 3865920. In the presence of substantial quantities of titanium tetrachloride oxidation under the conditions disclosed in that patent would lead to simultaneous oxidation of an appreciable proportion of the titanium tetrachloride and the resulting titanium dioxide would be lost in the form of an impurity of the iron oxide produced.

SUMMARY OF THE INVENTION

The present invention provides a process for the recovery of titanium tetrachloride by separating it from iron chloride contained in an effluent; the effluent comprising a gaseous mixture of titanium tetrachloride, and iron chloride which is predominantly in the form of ferric chloride, and resulting from the simultaneous chlorination of the iron and titanium values in an iron containing titaniferous ore; comprising mixing the effluent with oxygen; while maintaining the temperature of the effluent in the range from 500° C to 800° C; in a quantity in excess of that required in theory to oxidise the ferric chloride content of the effluent to produce ferric oxide and chlorine, the resulting mixture of the effluent, oxygen and chlorine having a velocity sufficient to entrain the resulting particles of ferric oxide, separating the particles of ferric oxide and cooling the remaining gases to a temperature above the boiling point of titanium tetrachloride condense residual ferric chloride, separating the condensed ferric chloride and recovering the remaining titanium tetrachloride containing vapour.

In practice the invention is suitably conducted by passing the mixture of effluent and oxygen through an essentially empty reactor while the oxidation is proceeding.

By an "essentially empty" reactor is meant any reactor, for example a pipe or flue, having no solid packing, baffles or the like which would act to prevent the entrainment of the iron oxide. We regard iron chloride as being predominantly in the form of ferric chloride if it is more than 50% and preferably more than 75% on a molar basis in that form.

DETAILED DESCRIPTION OF THE PREFERRED EMBODIMENTS OF THE INVENTION

Ilmenite is an iron containing titaniferous ore particularly suitable for simultaneous chlorination of iron and titanium values to produce a vapour to be treated according to this invention after the rock and earth constituents in natural ilmenite ore have been removed. Ilmenite prepared in this manner may contain up to about 65% by weight of titanium dioxide. Ores or ore concentrates which have already lost some of their iron values by natural or artificial means, for example, ores or ore concentrates which have been partially leached, may also be used, as may ilmenite sand. Hereafter the term "ore" is used to include each of these alternative raw materials.

The simultaneous chlorination of the iron and titanium values in an iron-containing titaniferous ore can produce an effluent containing iron and titanium chlorides in substantially the same proportion in which titanium and iron were present in the ore. The effluent treated according to this invention will not necessarily contain iron and titanium chlorides in exactly such a proportion due, for example, to recycling of a proportion of the iron values recovered or to the removal of a part of the iron values in the ore by other means before the present invention is utilised to separate titanium tetrachloride from the remainder. We believe that the proportion of iron values which are to be recycled will not exceed about 30% of the iron values in the ore, as hereafter explained, and so we envisage that in no case will the proportion of iron values exceed by more than that amount the proportion, relative to the quantity of titanium values, present in the ore fed into the chlorinator.

Since the ore may be an ore concentrate it is evident that there will be a substantial quantity of titanium tetrachloride present in the effluent. Were the ore chlorinated a Norwegian ilmenite, which is a low grade ilmenite usually containing not more than about 45% TiO$_2$ and up to 50% of iron oxides, and even assuming the recycle of not more than 30% of the iron oxides, it is evident that the proportion of titanium tetrachloride in the effluent from the simultaneous chlorination reaction would still be very substantial although approximating to the minimum proportion envisaged by this invention.

It is found, in practising the invention, that a large proportion of the ferric chloride in the effluent may be oxidised selectively, without any substantial oxidation of the titanium tetrachloride, and the product separated in solid form. The ferric chloride remaining unoxidised must be revolatilised and oxidised to recover the chlorine content thereof but, since the quantity involved may be relatively small in relation to the total iron content of the ore, the extra energy requirement is also relatively small in comparison with prior processes where revolatilisation of the entire iron content of the ore, in the form of ferric chloride, is necessary, and it is therefore possible to recycle condensed ferric chloride directly to the chlorinator where it is volatilised and oxidised.

According to a preferred feature of the invention an iron containing titaniferous ore is chlorinated in the form of a fluidised bed of the ore in admixture with particles of carbon. Preferably the chlorination is conducted at a temperature in the range 800° C to 1100° C and preferably in the range 850° C to 1100° C.

The ore suitably has a particle size of about 160 microns preferably with no particles outside the range of 75 to 500 microns. Initially the fluidised bed may consist of mineral rutile, which contains about 95% by weight of titanium dioxide, and coke, or alternatively a titanium dioxide containing mineral obtained by removing the iron values from a titaniferous ore, and coke, and is heated by burning the coke in oxygen-containing gas. When the desired chlorination temperature has been obtained chlorine is fed into the bed together with, if required, inert gas and a controlled quantity of oxygen. The bed is preferably operated continuously, by adding a stream of carbon, e.g. as coke, and ore to the bed. The composition of the gases entering the bed and the quantity of carbon are preferably adjusted to maintain the bed temperature within the desired range. Once fluidisation and chlorination have become established the solids entering the bed preferably comprise 60% to 80% by weight ilmenite and 20% to 40% by weight of carbon and the gases entering the bed preferably comprise 75% to 100% of chlorine and 0% to 15% of inert gas and 0% to 10% of oxygen. The rate of flow of the fluidising gas is controlled in known manner to maintain fluidisation. The rate of flow of the solid is preferably controlled to keep the bed level constant.

An effluent containing a mixture of titanium tetrachloride and ferric chloride issues from the bed substantially at bed temperature that is, preferably, at a temperature of from 850° C to 1100° C. It is found that if the effluent is contacted with oxygen at such a temperature the titanium tetrachloride is oxidised together with the ferric chloride. The effluent issuing from the bed is therefore cooled into the required range from 500° C to 800° C. Preferably, the temperature of the effluent is adjusted into the required temperature range either before it is contacted with oxygen or immediately thereafter to prevent any substantial oxidation of titanium tetrachloride.

Preferably the excess of oxygen is not more than 100% and at least 5%, and particularly preferably from 5% to 50% of that required in theory to oxidise the ferric chloride content of the effluent.

Preferably, a substantial free space is provided by using a relatively tall reactor and the upper free section is cooled sufficiently to produce the required temperature drop in the effluent to enable the above described selective oxidation of ferric chloride to be conducted. Usually the oxidation will at least have commenced within the free space above the fluidised bed and may continue after the vapour leaves the vessel. Preferably enough time is allowed to elapse to allow the reaction to proceed to a substantial extent before the solid ferric oxide produced is removed and the remaining gases cooled to condense residual ferric chloride. If the oxygen is introduced close to the surface of the fluidised bed it may react with particles of coke in suspension thus causing heat generation. Preferably, therefore, the oxygen is introduced a considerable distance above the fluidised bed surface where disentrainment of all but the finely divided carbon has occurred and heat evolution from this source is at a minimum.

In a preferred embodiment the surface of the fluidised bed is in the lower half of a fluidised bed reactor, the reactor encompassing a free space above the fluidised bed surface, said free space occupying a major proportion of the total vertical height of the reactor measured from the fluidised bed support plate. preferably the oxygen is introduced at or near the top of the free space. Alternatively the effluent from the fluidised bed may be mixed with oxygen by passing the oxygen into a duct through which the effluent is removed from the fluidised bed reactor.

Preferably the fluidised bed has the lower fluidised bed portion thereof bricked internally for heat retention and the upper section unbricked and externally water cooled to assist in cooling the effluent. A suitably wall temperature for the upper section is 150° C, if the reactor wall is of steel, or 450° C, if it is of nickel alloy. Further cooling of the effluent may be achieved by spraying liquid titanium tetrachloride into the free space about the fluidised bed and this also provides an efficient means for controlling the precise temperature of the vapour in said space without any containment of the effluent.

Make-up ore, coke, and recycled ferric chloride may be introduced into the reactor at a point just above the fluidised bed itself. The condensed residual ferric chloride may be recycled by feeding it, as hereafter described, onto the top of the fluidised bed as a solid and in this event will be vapourised by the hot effluent issuing from the bed. The quantity of ferric chloride vapourised in this manner may represent up to 30% of the iron content of the ore.

As explained above, the recovery of chlorine is important to the economic viability of the process. The product of the oxidation is a mixture of gases containing titanium tetrachloride, residual ferric chloride, a large quantity of chlorine, which chlorine is preferably recovered for recycle, and also oxygen and carbon dioxide. Entrained in this mixture of gases are the particles of ferric oxide formed on oxidation of the ferric chloride.

This mixture of gases leaving the oxidation zone and containing particles of ferric oxide, is preferably adjusted to a temperature above 250° C but low enough to encourage the condensation and solidification of chlorides of calcium and magnesium which may be present and also of ferrous chloride which may be present. These substances are undesirable for recycle to the fluidised bed. If any cooling is required to attain the desired temperature range this may be achieved easily while the gases are flowing through the duct provided for the removal of the effluent from the reactor. The ferric oxide particles and any condensed ferrous chloride and calcium or magnesium chloride are removed from the gases, preferably, by means of a cyclone.

The remaining gases issuing from the cyclone are preferably cooled to from 130° C to 150° C to condense residual ferric chloride without condensing the titanium tetrachloride. This cooling is readily achieved by passing the vapour through a particulated bed comprising iron-containing titaniferous ore and/or coke so as to condense the ferric chloride onto the ore and/or coke. Preferably, however, the ferric chloride is condensed onto the ore only and the coke is added directly to the solids being chlorinated and to the top of the fluidised bed, if used. Additionally external cooling of the vessel may be used.

The vapour recovered after condensation of the ferric chloride may be cooled to condense titanium tetrachloride therefrom. This titanium tetrachloride is suitable for use as a raw material for the production of titanium dioxide of pigment quality by vapour phase oxidation. Some of it may be used to provide the spray of liquid titanium tetrachloride into the oxidation zone as described above and some may be, and preferably is, used as an absorbent in the purification of the residual chlorine containing gases as hereafter described.

The vapour remaining after condensation of the $TiCl_4$ still contains chlorine and is preferably purified by known means for example, by the process described in British Pat. No. 664,615.

In that process a vapour containing chlorine, oxygen and carbon oxides is treated, to separate the chloride, with a liquid anhydrous absorbent which may be titanium tetrachloride, in a suitable absorption column. The absorption is preferably conducted at a low temperature for example as low as $-20°$ C. The chlorine is absorbed selectively and may be recovered from the absorbent by heating the absorbent under pressure, for example, at 230° C and 8 atmospheres pressure where the absorbent is titanium tetrachloride. Such recovered chlorine is recycled to the chlorinator together with any make-up chlorine required and the absorbent is recycled for further absorption. The titanium tetrachloride recovered in liquid form by condensation will contain dissolved chlorine. The use of this titanium tetrachloride in an absorption/desorption system as described above is advantageous since chlorine which had become dissolved in it during condensation will also be removed.

Alternatively any other known means for recovering chlorine from admixture with carbon oxides may be employed. This prevents the content of carbon oxides in the system rising undesirably.

According to one particularly preferred embodiment the invention provides a process for the recovery of titanium tetrachloride by separating it from iron chloride contained in an effluent; the effluent comprising a gaseous mixture of titanium tetrachloride and iron chloride which is predominantly in the form of ferric chloride, and resulting from a process comprising the steps of continuously feeding into a fluidised bed reactor solids comprising 60% to 80% by weight of ilmenite ore and from 20% to 40% by weight of coke; maintaining the solids in the fluidised state by means of a fluidising gas comprising from 75% to 100% by volume of chlorine, from 0% to 15% by volume of an inert gas and from 0% to 10% by volume of oxygen, maintaining the temperature of the fluidised solids in the range from 850° C to 1000° C, and controlling the rate of feed of solids to maintain the level of the surface of the fluidised solids at a point in the lower half of the reactor; the separation of the titanium tetrachloride being effected by passing the effluent from the surface of the fluidised bed upwardly through the upper half of the reactor, while cooling it to a temperature in the range from 500° C to 800° C by incoporating liquid titanium tetrachloride therein, mixing the cooled effluent at or near the top of the reactor, with oxygen in a quantity 5% to 100% in excess of the quantity required in theory to oxidise the ferric chloride content of the effluent to produce particles of ferric oxide the velocity of the resulting mixture of the remaining gases of the effluent, oxygen and chlorine being sufficient to entrain the said particles, removing the said mixture and entrained particles from the reactor, adjusting the temperature of the removed mixture firstly to above 250° C but low enough to solidify any calcium or magnesium chlorides which may be present therein and removing ferric oxide particles and any resulting solid calcium or magnesium chlorides; further cooling the mixture to a temperature in the range from 250° C to 130° C to solidify any residual ferric chloride, removing any resulting particles of ferric chloride from the mixture; further cooling the mixture to below 130° C to condense titanium tetrachloride therefrom, recovering the condensed titanium tetrachloride; recovering residual chlorine from the remaining vapours by selective absorption in titanium tetrachloride followed by desorption, and recycling the recovered chlorine into the fluidising gas, incorporating residual ferric chloride in the solids in the fluidised bed reactor and utilising a proportion of the liquid titanium tetrachloride recovered to cool the effluent from the fluidised bed.

BRIEF DESCRIPTION OF THE DRAWINGS

In order that the invention may be more readily understood an example of a cyclic embodiment thereof will now be described in general tems with reference to the attached drawings.

FIG. 2 shows in section an alternative arrangement for introducing oxygen into the effluent from the fluidised bed.

Figure 1:
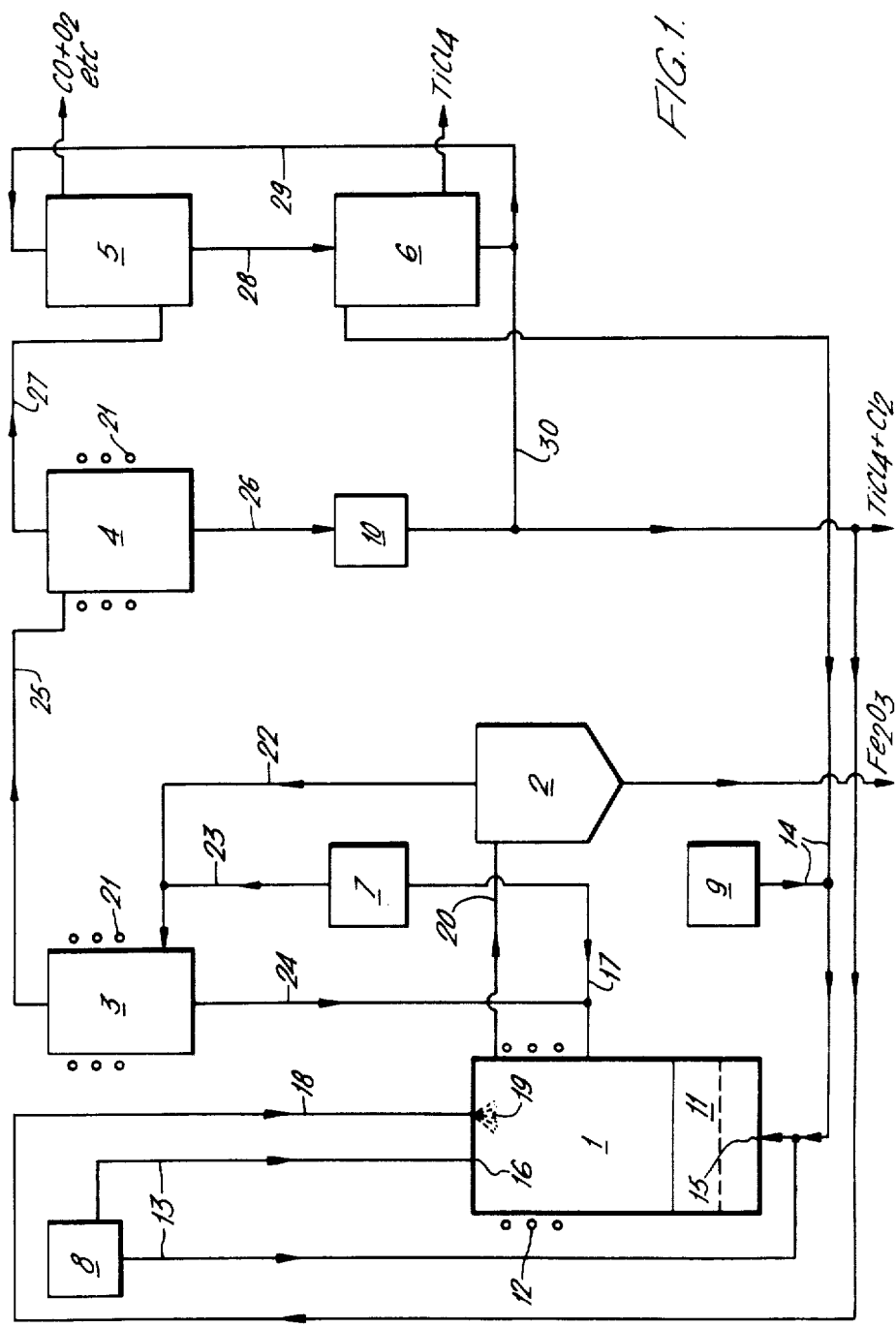
FIG. 1 shows a block diagram of a plant layout.

The plant layout comprises a reactor in the form of a chlorination tower 1 in which a titaniferous ore may be chlorinated in a fluidised bed to produce a mixed titanium tetrachloride/ferric chloride effluent which is then cooled and mixed with oxygen to oxidise the ferric chloride to ferric oxide, a cyclone 2, in which the ferric oxide may be separated, a condensing vessel 3, in which residual ferric chloride vapour may be condensed, a further condensing vessel 4, in which titanium tetrachloride vapour may be condensed, an absorption vessel 5, in which chlorine vapour may be separated from residual vapours by absorption in a suitable liquid absorbent, and a desorption vessel 6, by means of which the absorbed chlorine may be recovered. Ancillary vessels comprising coke/titaniferous ore storage hopper means 7, an oxygen storage vessel 8, a chlorine storage vessel 9 and a titanium tetrachloride liquid storage vessel 10, are also depicted.

The chlorination tower 1 comprises a fluidised bed support plate, and cooling coils 12 which assist in the cooling of the effluent issuing from the fluid bed 11. Supply lines 13 for oxygen and 14 for chlorine are provided together with a common entry port 15 for oxygen and chlorine at the base of the chlorination tower 1. A separate entry port 16 for oxygen is provided at the top of the chlorination tower. A supply line 17 for titaniferous ore and coke and a line 18 for liquid titanium tetrachloride are also provided and the supply line 18 terminates in a spray head 19. Line 20 is provided for the removal of the effluent and entrained solids from the chlorination tower 1.

The condensing vessels 3 and 4 are cooled by cooling coils 21.

In operation of a process according to the invention, the area immediately above the fluidised bed support in the chlorination tower 1 is fed with a mixture of coke and rutile or other suitable titanium dioxide containing material of a suitable particle size for fluidisation so as to leave a free space above the bed. Oxygen is introduced through inlet port 15, the coke/rutile mass is fluidised and the coke/oxygen mixture is ignited to preheat the bed. As soon as the temperature reaches the desired operating level the oxygen supply is suitable reduced for the maintenance of the required temperature level and chlorine is introduced through inlet portion 15 and a continuous supply of titaniferous ore/coke mixture is fed onto the top of the bed through the supply line 17 from the ore and coke storage hopper 7. Simultaneously oxygen is introduced into the chlorinator through the entry port 16.

The upper part of the tower is cooled by the cooling coils 12 and by a spray of titanium tetrachloride liquid issuing from the spray head 19 to maintain at least the upper portion of the space above the fluidised bed at a temperature below 800° C. The effluent rising from the fluidised bed, comprising a gaseous mixture of titanium tetrachloride and ferric chloride, is subjected to selective oxidation of the ferric chloride and a mixture of gases containing ferric oxide particles resulting from the oxidation, ferric chloride remaining, titanium tetrachloride, oxygen, chlorine, and carbon oxides is removed through line 20. This mixture of gases is fed into the cyclone 2, being first cooled to between 500° C and 250° C, to separate the ferric oxide, which is recovered. The remaining gases are removed from the cyclone through line 22, are mixed with ore supplied from the storage hopper 7 by line 23 to reduce the temperature still further and the mixture is fed into the condensing vessel where the ferric chloride condenses at a temperature of about 130° C to 150° C onto the ore. This solid mixture is removed through line 24 and is introduced to the tower 1 through ore supply line 17.

The gases issuing from the condensing vessel 3 comprise titanium tetrachloride, chlorine, oxygen and carbon oxides. The vapour is introduced through line 25 into the condensing vessel 4 where the titanium tetrachloride is condensed and removed through line 26 to the storage vessel 10. The vapour issuing from the condensing vessel 4 comprising mainly chlorine, oxygen and carbon oxides is introduced through line 27 into the absorption vessel 5 where the chlorine content is absorbed in titanium tetrachloride at a temperature of about 0° C. The loaded titanium tetrachloride is passed through line 28 to the desorption vessel 6 and is there heated under pressure to expel the chlorine which is removed through the line 14 whereby it is recycled to the chlorination tower 1, together with additional chlorine, as required, from the chlorine storage means 9. The remaining titanium tetrachloride from the desorption vessel 6 is recycled through line 29 to the absorption vessel 5 together with, as required, additional titanium tetrachloride from the titanium tetrachloride storage vessel 10, supplied through the line 30.

The gases issuing from the absorption vessel 5 comprise carbon oxides and oxygen and are not further purified but are issued to the atmosphere. Titanium tetrachloride from which absorbed chlorine has been removed or alternatively titanium tetrachloride still containing some absorbed chlorine may be removed from the plant at the appropriate points.

In an alternative form of apparatus in which shown in FIG. 2 the duct 20 for the removal of the effluent from the fluidised bed reactor 1 extends horizontally from the upper part of the fluidised bed reactor and is provided with flexible bellows 32 providing a point of attachment to the inlet pipe 33 of the cyclone 2. The oxygen is introduced through pipe 13 which is arranged to join the duct 20 and has an open end 31 concentric with the tube 20.

EXAMPLE

Using equipment similar to that above described in FIG. 1 a mass consisting of 25 kg mineral rutile and 6.5 kg coke in particulate form was fluidised using dry oxygenenriched air, in a fluidised bed chlorination tower, 2.7 m in height, and 150 mm in diameter, The coke was ignited to raise the temperature of the bed to 1000° C. Fluidisation was continued using 0.06 kg moles/hour chlorine as a mixture of oxygen and chlorine in a 1:19 volume ratio and the bed weight was maintained by a stream of 3,0 kg per hour of ilmenite sand low in manganese oxide containing 59.6% of titanium dioxide and 25% of iron oxides by weight, the balance of the composition of the sand consisting of inert materials, and 0.8 kg per hour of coke.

An effluent comprising a gaseous mixture of titanium tetrachloride and ferric chloride issued from the fluidised bed surface.

The chlorination tower was so proportioned as to allow a disentrainment space for carbon dust above the bed and, above this, a further free space. The effluent was cooled to a temperature of 600° C by contact with a stream of titanium tetrachloride liquid sprayed downwardly from the spray head 19. Oxygen was introduced through the port 16 into the free space above the fluidised bed and above the carbon dust disentrainment space in a quantity of 120%, on a molar basis, of that required in theory to oxidise the ferric chloride in the vapour to ferric oxide. This corresponded to an input flow of 0.1 kg moles of oxygen per hour.

The gases emerging from the chlorination tower were cooled to a temperature of 300° C and the suspended ferric oxide particles were removed by means of the cyclone 2.

The quantity of ferric oxide recovered in this manner was 80% of the total iron oxides content of the ilmenite stream entering the reactor. The remaining vapours were contacted with ilmenite sand and further cooled to 140° C in the condensing vessel 3 to condense the remaining ferric chloride onto the ilmenite, which was then fed as above described with a coke required into the chlorination tower. The vapours remaining after the condensation of the ferric chloride were cooled to −30° C in the condensing vessel 4 to condense titanium tetrachloride which was recovered in a 93% yield with respect to the titanium dioxide content of the ilmenite sand introduced into the chlorination tower.

I claim:

1. A process for the recovery of titanium tetrachloride by separating it from iron chlorides contained in an effluent; the effluent comprising a gaseous mixture of titanium tetrachloride, and iron chlorides which comprise more than 50 percent of ferric chloride, and resulting from the simultaneous chlorination of the iron and titanium values in an iron containing titaniferous ore; comprising mixture the effluent with oxygen, while maintaining the temperature of the effluent in the range from 500° C to 800° C, in a quantity in excess of that required in theory to oxidise the ferric chloride content of the effluent to produce ferric oxide and chlorine, the resulting mixture of the effluent, oxygen and chlorine having a velocity sufficient to entrain the resulting particles of ferric oxide, separating the particles of ferric oxide and cooling the remaining gases to a temperature above the boiling point of titanium tetrachloride to condense residual ferric chloride, separating the condensed ferric chloride and condensing titanium tetrachloride from the residual vapour.

2. A process as claimed in claim 1 wherein the effluent results from the simultaneous chlorination of the iron and titanium values of an ilmenite ore.

3. A process as claimed in claim 2 wherein the proportion of iron values to the titanium values in the effluent is not more than 30% in excess, on a molar basis, over the proportion present in the ironcontaining titaniferous ore.

4. A process as claimed in claim 2 wherein at least 75% of the iron chloride, on a molar basis, is in the form of ferric chloride.

5. A process as claimed in claim 2 wherein the effluent results from the chlorination of an ilmenite ore in the form of a fluidised bed of particles of the ore mixed with particles of carbon.

6. A process as claimed in claim 5 wherein the fluidised bed is operated continuously, the solids entering the bed comprise 60% to 80% by weight of ore and from 20% to 40% by weight of carbon, and the gases entering the bed comprise 75% to 100% by volume of chlorine, 0% to 15% by volume of inert gases and 0% to 10% by volume of oxygen.

7. A process as claimed in claim 6 wherein chlorination is conducted at a temperature in the range 850° C to 1100° C.

8. A process as claimed in claim 7 wherein the effluent issuing from the fluidised bed is cooled into the range of 500° C to 800° C before being mixed with oxygen by means comprising spraying liquid titanium tetrachloride into the effluent.

9. A process as claimed in claim 7 wherein the effluent issuing from the fluidised bed is cooled into the range 500° C to 800° C before being mixed with oxygen by means comprising contact with a fluidised bed reactor wall maintained, at a level above the surface of the fluidised bed, at a temperature in the range 150° C to 450° C.

10. A process as claimed in claim 5 wherein the fluidised bed is contained in the lower half of a fluidised bed reactor the reactor encompassing a free space above the surface of the fluidised bed, said free space occupying a major proportion of the total vertical height of the fluidised bed reactor measured from the bed support plate.

11. A process as claimed in claim 10 wherein the effluent issuing from the fluidised bed is mixed with oxygen by passing the oxygen into the free space at or near the top thereof.

12. A process as claimed in claim 10 wherein the effluent issuing from the fluidised bed is mixed with oxygen by passing the oxygen into a duct through which the effluent is removed from the reactor containing the fluidised bed.

13. A process as claimed in claim 2 wherein the effluent is contacted with a quantity of oxygen from 5% to 100% in excess, on a molar basis, of that required to oxidise the ferric chloride content of the effluent.

14. A process as claimed in claim 2 operated in a cyclic manner wherein the condensed residual ferric chloride is returned to the reactor.

15. A process as claimed in claim 14 wherein residual chlorine is separated from the titanium tetrachloride containing vapour, remaining after the residual ferric chloride is condensed, and the chlorine so separated is returned to the reactor.

16. A process for the recovery of titanium tetrachloride by separating it from iron chloride contained in an effluent; the effluent comprising a gaseous mixture of titanium tetrachloride and iron chloride which is predominantly in the form of ferric chloride, and resulting from a process comprising the steps of continously feeding into a fluidised bed reactor solids comprising 60% to 80% by weight of ilmenite ore and from 20% to 40% by weight of coke; maintaining the solids in the fluidised state by means of a fluidising gas comprising from 75% to 100% by volume of chlorine, from 0% to 15% by volume of an inert gas and from 0% to 10% by volume of oxygen, maintaining the temperature of the fluidised solids in the range from 850° C to 1000° C and controlling the rate of feed of solids to maintain the level of the surface of the fluidised solids at a point in the lower half of the reactor, the separation of the titanium tetrachloride being effected by passing the effluent from the surface of the fluidised bed upwardly through the upper half of the reactor, while cooling it to a temperature in the range from 500° C to 800° C by incorporating liquid titanium tetrachloride therein, mixing the cooled effluent at or near the top of the reactor, with oxygen in a quantity 5% to 100% in excess of the quantity required in theory to oxidise the ferric chloride content of the effluent to produce particles of ferric oxide, the velocity of the resulting mixture of the remaining gases of the effluent, oxygen and chlorine being sufficient to entrain the said particles, removing the said mixture and entrained particles from the reactor, adjusting the temperature of the removed mixture firstly to above 250° C but low enough to solidify any calcium or magnesium chlorides which may be present therein and removing ferric oxide particles and any resulting solid calcium or magnesium chlorides; further cooling the mixture to a temperature in the range from 250° C to 130° C to solidify any residual ferric chloride, removing any resulting particles of ferric chloride from the mixture; further cooling the mixture to below 130° C to condense titanium tetrachloride therefrom, recovering the condensed titanium tetrachloride; recovering residual chlorine from the remaining vapours by selective absorption in titanium tetrachloride followed by desorption, and recycling the receovered chlorine into the fluiding gas, incorporating residual ferric chloride in the solids in the fluidised bed reactor and utilising a proportion of the liquid titanium tetrachloride recovered to cool the effluent from the fluidised bed.

* * * * *